United States Patent
Ohara

(10) Patent No.: US 6,300,264 B1
(45) Date of Patent: Oct. 9, 2001

(54) LUMINOUS GLASS

(75) Inventor: Kazuo Ohara, Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

(21) Appl. No.: 09/245,709

(22) Filed: Feb. 8, 1999

(30) Foreign Application Priority Data

Sep. 8, 1998 (JP) .................................... 10-254182

(51) Int. Cl.[7] ............................. C03C 3/095; C03C 3/097
(52) U.S. Cl. ................ 501/64; 501/63; 501/69; 501/70; 252/301.4 F; 252/301.6 F
(58) Field of Search .................. 501/63, 64, 69, 501/70, 72; 252/301.6 R, 301.6 P, 301.4 F, 301.4 P

(56) References Cited

U.S. PATENT DOCUMENTS

| | | | |
|---|---|---|---|
| 3,457,182 | * 7/1969 | Lee et al. | 501/64 |
| 3,457,183 | 7/1969 | Lee, Jr. et al. | |
| 3,522,190 | * 7/1970 | Turner et al. | |
| 3,843,551 | * 10/1974 | Muller et al. | 501/64 |
| 3,954,656 | * 5/1976 | Deeg et al. | 501/64 |
| 4,102,805 | * 7/1978 | Mizzoni et al. | 501/64 |
| 4,396,720 | * 8/1983 | Beall et al. | 501/64 |
| 4,798,768 | * 1/1989 | Oversluizen et al. | 501/64 |
| 5,508,235 | 4/1996 | Marker . | |
| 5,591,682 | 1/1997 | Goto . | |
| 5,798,306 | 8/1998 | Dickinson, Jr. . | |

FOREIGN PATENT DOCUMENTS

| | | |
|---|---|---|
| 42 31 794 A1 | 3/1994 | (DE) . |
| 0 924 171 A1 | 6/1999 | (EP) . |
| 1318640 | 5/1973 | (GB) . |
| 1336321 | 11/1973 | (GB) . |
| A-61-151034 | 7/1986 | (JP) . |
| A-9-188543 | 7/1997 | (JP) . |
| 7302084 | * 8/1973 | (NL) . |

OTHER PUBLICATIONS

*New Glass Handbook*, Maurzen, Jun. 25, 1991, pp. 405–406.

* cited by examiner

*Primary Examiner*—David R Sample
(74) *Attorney, Agent, or Firm*—Oliff & Berridge, PLC

(57) ABSTRACT

A luminous glass comprising, in percent by weight, the following components:

| | |
|---|---|
| $SiO_2$ | 46–66 |
| $Al_2O_3$ | 18–30 |
| MgO | 0–12 |
| CaO | 0–16 |
| ZnO | 0–21 |
| $P_2O_5$ | 0–10 |
| $Li_2O$ | 0–8 |
| BaO | 0–9 |
| $As_2O_3 + Sb_2O_3$ | 0–2 | wherein a ratio of $Al_2O_3$ to $SiO_2$ is 0.32–0.56, a total amount of MgO, CaO, and ZnO is 2–34 wt. %, a total amount of $P_2O_5$, $Li_2O$, and BaO is 0–21 wt. %, and one or more rare earth elements are added to the glass on an oxide basis of 0.1–30 wt. % to an total amount of the components, PbO, $B_2O_3$, BeO, $Na_2O$, and $K_2O$ are not essentially contained, and the glass has a thermal shock resistance $|\Delta t|°$ C. of not less than 150, which is obtained by following equation, $|\Delta t|=[\text{flexural strength}]\times(1-[\text{Poisson's ratio}])/([\text{coefficient of thermal expansion}]\times[\text{Young's modulus}])$.

9 Claims, No Drawings

LUMINOUS GLASS

BACKGROUND OF THE INVENTION

1. Field of the Invention

The present invention relates to luminous glass containing rare earth ions, wherein the characters of thermal expansion and mechanical strength, of the luminous glass are improved. In particular, the invention relates to the luminous glass which can be suitably applied to an oscillation medium for laser oscillation, an excitation light filter or the like.

2. Description of Related Art

For materials which are applied as the luminous materials in earlier technology, a glass material, a single crystal material, and a ceramic material have been known.

For the glass material, for example, various laser glasses such as quartz laser glass, phosphate system laser glass or the like, which contain rare earth ions and are applied to oscillation medium for laser oscillation have been known.

The luminous glass material is not only applied to the laser glass. For example, Japanese Patent Application No. 9-188543 laid open discloses blue emission glass which can be applied to; optical detector which applied to confirmation of radiation beam position such as ultraviolet beam, X-ray or the like, mode pattern recognition, spatial distribution state; an element for optical power meter; an image displaying sensor; and the like.

However, there are problems of the thermal resistance in the glass material in earlier technology. That is, because the glass material has a high coefficient of thermal expansion, when the glass material is subjected to irradiation by an excitation light with high intensity, the glass material breaks under thermal expansion thereof. When the glass material is used under such environmental circumstances, temperature of which is largely or rapidly changed, the glass material breaks under thermal fatigue thereof. Accordingly, there is a problem that the condition and circumstances, for using the glass material are limited.

Therefore, for example, it is required for the luminous glass material which is applied to the oscillation medium for laser oscillation or the wavelength conversion filter for excitation light of laser to prevent occurring large or rapid change of temperature, or to change the glass material to another one before the glass material thermally fatigues.

On the other hand, there are problems for the luminous single crystal material that it is difficult to uniformly dope the optically active elements to the single crystal material and to produce a product of the single crystal material having practically large size. It is suitable for the glass material to produce a product having large size compared with the single crystal material.

There is a problem that the ceramic material is liable to occur a light scattering caused by grain boundaries and pores, of the ceramic material, which is character there of. Therefore, it is difficult to apply the ceramic material to such an application requiring transparent luminous material.

SUMMARY OF THE INVENTION

The present invention has been developed in view of the problems.

An object of the present invention is to provide a luminous glass which can solve the problems of luminous materials in earlier technology, that is, the problems of thermal properties, for example, the break under the locally thermal expansion thereof or a heat shock, or the like, caused by the high coefficient of thermal expansion.

Another object of the invention is to provide a luminous glass which can solve the problems in the non-uniform distribution of the optically active element in the single crystal material in earlier technology and in the occurrence of the light scattering caused by the grain boundaries and the pores, of the ceramic material in the earlier technology.

Further object of the invention is to provide a luminous glass which can be easily produced.

Still further object of the invention is to provide a method for producing luminous glass having the superior thermal properties above-described.

The inventors have made various efforts to solve the problems above-described. As a result, it is developed that the glass having a rare earth element has superior thermal character and optical homogeneity and can be easily produced. Then, the inventors have achieved the invention.

In order to accomplish the above objects, in accordance with one aspect of the invention, a luminous glass having a thermal shock resistance $\Delta t°$ C. of not less than 150° C., wherein the thermal shock resistance $\Delta t$ is obtained by following equation, $\Delta t = [\text{flexural strength}] \times (1 - [\text{Poisson's ratio}]) / ([\text{coefficient of thermal expansion}] \times [\text{Young's modulus}])$. In the luminous glass, PbO, $B_2O_3$, BeO, $Na_2O$, and $K_2O$ can not be essentially contained.

According to the luminous glass of the invention, because the thermal shock resistance $\Delta t°$ C. thereof is not less than 150° C., even though the glass is subjected to the irradiation by the high intense excitation light, it is possible to resist the locally thermal expansion thereof caused by heat generation, the heat shock, the thermal fatigue with the passage of time under the intermittent irradiation by excitation light, or the like. Therefore, it is possible to apply the luminous glass of the invention to various optical products without limitation of the condition and circumstances, for using the luminous glass, for example, the luminous glass can be suitably applied to oscillation medium for laser oscillation and the wavelength conversion filter for excitation light.

The luminous glass can comprise the following components:

| | Wt. % |
|---|---|
| $SiO_2$ | 46–66 |
| $Al_2O_3$ | 18–30 |
| MgO | 0–12 |
| CaO | 0–16 |
| ZnO | 0–21 |
| $P_2O_5$ | 0–10 |
| $Li_2O$ | 0–8 |
| BaO | 0–9 |
| $As_2O_3 + Sb_2O_3$ | 0–2 | wherein a ratio of $Al_2O_3$ to $SiO_2$ can be 0.32–0.56, a total amount of MgO, CaO, and ZnO can be 2–34 wt. %, a total amount of $P_2O_5$, $Li_2O$, and BaO can be 0–21 wt. %, and one or more rare earth elements can be added to the glass on an oxide basis of 0.1–30 wt. % to an total amount of the components.

The luminous glass can comprise the following components:

|  | Wt. % |
| --- | --- |
| SiO$_2$ | 46–66 |
| Al$_2$O$_3$ | 18–30 |
| MgO | 1–12 |
| CaO | 0–12 |
| ZnO | 0–18 |
| P$_2$O$_5$ | 0–10 |
| Li$_2$O | 0–7 |
| BaO | 1–9 |
| As$_2$O$_3$ + Sb$_2$O$_3$ | 0–2 | wherein a ratio of Al$_2$O$_3$ to SiO$_2$ can be 0.32–0.56, a total amount of MgO, CaO, and ZnO can be 2–28 wt. %, a total amount of P$_2$O$_5$, Li$_2$O, and BaO can be 1–20 wt. %, and one or more rare earth elements can be added to the glass on an oxide basis of 0.1–30 wt. % to an total amount of the components.

The luminous glass can comprise the following components:

|  | Wt. % |
| --- | --- |
| SiO$_2$ | 46–66 |
| Al$_2$O$_3$ | 18–30 |
| MgO | 1–10 |
| CaO | 0–8 |
| ZnO | 0–16 |
| P$_2$O$_5$ | 0–10 |
| Li$_2$O | 2–6 |
| BaO | 1–6 |
| As$_2$O$_3$ + Sb$_2$O$_3$ | 0–2 | wherein a ratio of Al$_2$O$_3$ to SiO$_2$ can be 0.32–0.56, a total amount of MgO, CaO, and ZnO is 2–23 wt. %, a total amount of P$_2$O$_5$, Li$_2$O, and BaO can be 3–19 wt. %, and one or more rare earth elements can be added to the glass on an oxide basis of 0.1–30 wt. % to an total amount of the components.

According to the luminous glass of the invention, the luminous glass is close and have superior homogeneity, high mechanical strength, and chemical durability. Further, the luminous glass of the invention has lower coefficient of thermal expansion and larger flexural strength in comparison to the luminous glass in earlier technology. As a result, the luminous glass has high thermal shock resistance. In addition, because it is glass, the luminous glass of the invention has superior formability.

Therefore, it is possible to apply the luminous glass of the invention to extremely various application as luminous material substituted for the glass material, the single crystal material, and the ceramics material.

In accordance with another aspect of the invention, a method for producing a luminous glass having a thermal shock resistance Δt° C. of not less than 150° C. the method comprises the steps of: mixing raw materials of components of the glass; charging the resulting mixture into a melting apparatus; melting the mixture at temperature of about 1530–1570° C. for about 8 hours and homogenizing by agitating; and casting the homogenized mixture in an iron board, annealing and cooling to room temperature. In the method, PbO, B$_2$O$_3$, BeO, Na$_2$O, and K$_2$O can not be essentially contained in the luminous glass.

In the method, the luminous glass can comprise the following components:

|  | Wt. % |
| --- | --- |
| SiO$_2$ | 46–66 |
| Al$_2$O$_3$ | 18–30 |
| MgO | 0–12 |
| CaO | 0–16 |
| ZnO | 0–21 |
| P$_2$O$_5$ | 0–10 |
| Li$_2$O | 0–8 |
| BaO | 0–9 |
| As$_2$O$_3$ + Sb$_2$O$_3$ | 0–2 | wherein a ratio of Al$_2$O$_3$ to SiO$_2$ is 0.32–0.56, a total amount of MgO, CaO, and ZnO is 2–34 wt. %, a total amount of P$_2$O$_5$, Li$_2$O, and BaO is 0–21 wt. %, and one or more rare earth elements are added to the glass on an oxide basis of 0.1–30 wt. % to an total amount of the components.

According to the method of the invention, because the luminous glass can be produced by the method for producing glass, the luminous glass has superior formability and easiness of production.

PREFERRED EMBODIMENT OF THE INVENTION

The luminous glass according to the embodiment of the present invention will be explained as follows.

At first, the reasons for limiting the range of the thermal shock resistance Δt° C. and the composition, of the luminous glass to that above-described will be explained as follows.

The thermal shock resistance Δt is an index to a heat-resistance impact, which is represented by the following equation, Δt=[flexural strength]×(1−[Poisson's ratio])/([coefficient of thermal expansion]×[Young's modulus]) and which is stated in "New Glass Handbook" edited by editorial committee of New Glass Handbook, published by Maruzen, pages 405–406. It is judged that the larger the thermal shock resistance becomes, the larger the resistance to the difference in temperature, of the glass becomes.

Applicant carried out various tests and found that it is required for the glass that the value of Δt thereof is not less than 150 to be applied to the oscillation medium for laser oscillation or the wavelength conversion filter for excitation light, which is subjected to irradiation by the high intense excitation light. Preferably, it is required the value of Δt is not less than 200.

The thermal shock resistance of almost luminous glasses in earlier technology are not more than 100, and the largest value thereof are not more than 130.

On the contrary, the luminous glass of the invention has the thermal shock resistance of not less than 150 which is remarkably larger than the glass in earlier technology. Further, it is easy to obtain the glass having such high thermal shock resistance because the glass possesses ranges of compositions described as follows.

According to the luminous glass of the invention, because the luminous glass has extremely high thermal shock resistance Δt, even though the luminous glass is subjected to irradiation by the high intense excitation light, the luminous glass can resist the locally thermal expansion thereof caused by the heat generation, the heat shock, or the thermal fatigue with the passage of time by the excitation light irradiated intermittently.

As described above, according to the luminous glass of the invention, because the luminous glass has the thermal shock resistance Δt of not less than 150, it is possible to suitably apply the luminous glass to optical glass for oscillation medium for laser oscillation, the wavelength conversion filter for excitation light or the like.

The compositions of the luminous glass according to the embodiment of the invention will be explained as follows.

The luminous glass does not have to contain PbO, $B_2O_3$, BeO, $Na_2O$, and $K_2O$ practically, because PbO has unfavorable effects on humans and the environment, $B_2O_3$ makes chemical durability and emission intensity, of the glass low, BeO has unfavorable effects on the environment, and because $Na_2O$ and $K_2O$ make chemical durability of the glass low.

Regarding the $SiO_2$ component, when the $SiO_2$ content is less than 46 wt. %, the thermal shock resistance Δt of obtained glass is deteriorated. On the other hand, when the $SiO_2$ content is more than 66 wt. %, the raw materials of the glass are difficult to melt and the glass melt is difficult to refine so that the chemical homogeneously of the product is deteriorated.

When the $Al_2O_3$ content is less than 18 wt. %, it is difficult to melt the raw materials of the glass and the resistance to devitrification thereof is deteriorated. On the other hand, when the $Al_2O_3$ content is more than 30 wt. %, it is also difficult to melt the raw materials of the glass and the resistance to devitrification thereof is deteriorated.

The weight ratio of the $Al_2O_3$ component to the $SiO_2$ component should be 0.32–0.56. Because when the ratio is less than 0.32, it is difficult to melt the raw materials of the glass and the resistance to devitrification thereof is deteriorated. Further, a coefficient of thermal expansion of the glass becomes large, so that the glass having desired thermal shock resistance can not be obtained.

Three components of MgO, ZnO, and CaO have effects of improving the melting of raw materials of the glass and the refining of the glass melt. Further, when the weight ratio of the $Al_2O_3$ component to the $SiO_2$ component is within in the range of 0.32–0.56, these components have effect of reducing the coefficient of thermal expansion and improving the thermal shock resistance.

However, when the MgO content is more than 12 wt. %, the CaO content is more than 16 wt. %, the ZnO content is more than 21 wt. %, respectively, the effects described above can not be obtained, the resistance to devitrification of the glass is deteriorated. Preferable range of the MgO content is 1–12wt. %, the CaO content is 0–12 wt. %, and the ZnO content is 0–18 wt. %. More preferable range of the MgO content is 1–10 wt. %, the CaO content is 1–8 wt. %, and the ZnO content is 0–16 wt. %.

Further, when the total amount of three components is less than 2 wt. %, the effects described above can not be obtained. On the contrary, when the total amount of three components is more than 34 wt. %, the effects described above can not be obtained, like the case of each component, and the resistance to devitrification of the glass is deteriorated. Preferable range of the total amount of the three components is 2–28 wt. %, more preferably, 2–23 wt. %.

Each component of $P_2O_5$, $Li_2O$, and BaO has effects of improving melting of the raw materials of the glass, refining of the glass melt, and emission intensity of the glass.

However, when the $P_2O_5$ content is more than 10 wt. %, the $Li_2O$ content is more than 8 wt. %, the BaO content is more than 9 wt. %, respectively, the effects described above can not be obtained, and the resistance to devitrification of the glass is deteriorated. Further, the coefficient of thermal expansion of the glass becomes large, so that the glass having desired thermal shock resistance can not be obtained. Preferable range of the $Li_2O$ content is 0–7 wt. % and the BaO content is 1–9 wt. %. More preferable range of the $Li_2O$ content is 2–6 wt. % and the BaO content is 1–6 wt. %. When the total amount of three components is more than 21 wt. %, the effects described above can not be obtained, like the case of each component, and the resistance to devitrification of the glass is deteriorated. Further, the coefficient of thermal expansion of the glass becomes large, so that the glass having desired thermal shock resistance can not be obtained. Preferable range of the total amount of the three components is 1–20 wt. %, more preferably, 3–19 wt. %.

$As_2O_3$ and $Sb_2O_3$ can be added as refining agents in the melting process of the raw materials of the glass to obtain the chemically homogenous products, however, the total amount of them are sufficient up to 2 wt. %.

Oxide components of rare earth elements are important as optically active components. Added amount of one or more rare earth components on an oxide basis must be 0.1–30 wt. % in the ratio by weight to the total amount of other glass components described above.

The preferable components which have particularly emission property are $Dy_2O_3$, $Nd_2O_3$, $Eu_2O_3$, $Er_2O_3$, $Sm_3O_3$, $Tb_2O_3$, $Ce_2O_3$, and $Yb_2O_3$. It is preferable for the glass to have the total amount of one or more these components on an oxide basis of 0.1–30 wt. % in the ratio by weight to the total amount of other glass components described above.

The oxide components of rare earth elements which are added to the glass should be carefully selected the types and amount, thereof, which are not limited, when the glasses are for applying to the ultraviolet sensor, the laser medium, the scintillator for radiation, the cover glass for the solar battery, the fluorescent substance for illuminating or displaying, the electro luminescent materials, decorating glass or the like to prevent the quenching, that is, the decrease of emission efficiency when the optically active components are high concentration or by the interactions of the optically active components with each other.

It is possible to control the emission colors by selecting the types, combination of types, and amount of added oxide components of rare earth elements.

It is also possible to add other ingredients in the range of maintaining the desired property of the glass of the invention. For example, the ingredients which are $ZrO_2$, SrO, CoO, NiO, $MnO_2$, and $Cr_2O_3$ can be added in total amount of. one or more types thereof up to 15 wt. %, and the components for improving resistance to ultraviolet and radiation, which are $F_2$, $La_2O_3$, $Nb_2O_5$, $TiO_2$, $MoO_3$, $Ta_2O_5$, $Bi_2O_3$, $WO_3$, $Fe_2O_3$, $SnO_2$, CuO, or the like can be added in total amount of one or more than two types thereof up to 8 wt. %, respectively.

The luminous glass according to the embodiment of the invention is produced by mixing the raw materials of the glass to have the composition above-described, melting the raw materials at predefined temperature for predefined times, thereafter, forming the melted mixture, and annealing the formed mixture. As a result, the luminous glass is obtained.

EXAMPLES

The invention is further explained below with reference to examples. However, the invention is, of course, not limited to the examples.

Tables I, II and III show compositions by weight % and some properties, of the luminous glasses according to the examples 1 to 10 of the invention and a compared example. The properties given in Tables I, II and III are the melting temperature of the raw materials of the glasses, the emission color and the wavelength of main emission, when the excitation light is irradiated to the glasses, the coefficient a of thermal expansion, the Poisson's ratio, the Young's modulus, the flexural strength, and the thermal shock resistance $\Delta t$, of the luminous glasses according to the examples 1 to 10 and the compared example.

TABLE I

|  | EXAMPLES | | | |
|---|---|---|---|---|
|  | 1 | 2 | 3 | 4 |
| $SiO_2$ | 56.7 | 53.5 | 56.5 | 57.7 |
| $P_2O_5$ | — | — | 8.2 | 8.4 |
| $Al_2O_3$ | 24.1 | 22.7 | 24.6 | 25.2 |
| $Li_2O$ | — | — | 4.1 | 4.2 |
| MgO | — | 5.7 | 1.0 | 1.0 |
| CaO | — | — | 1.0 | 1.0 |
| BaO | — | — | 1.0 | 1.0 |
| ZnO | 19.2 | 18.1 | 0.5 | 0.5 |
| $La_2O_3$ | — | — | 2.1 | — |
| $As_2O_3$ | — | — | 1.0 | 0.5 |
| $Sb_2O_3$ | — | — | — | 0.5 |
| Subtotal (wt. %) | 100.0 | 100.0 | 100.0 | 100.0 |
| Ratio of added amount of the rare earth oxide to total amount of the others | $Tb_2O_3$ 1.0 | $Tb_2O_3$ 1.0 | $Ce_2O_3$ 4.1 | $Ce_2O_3$ 4.2 |
| Total (wt. %) | 101.0 | 101.0 | 104.1 | 104.2 |
| Melting temperature (° C.) | 1570 | 1570 | 1530 | 1530 |
| Emission color | Green | Green | Blue | Blue |
| Wavelength of main emission (nm) | 485, 550 | 485, 550 | 420 | 420 |
| Coefficient of thermal expansion $\alpha \times 10^{-7}$/° C. (100° C. to 300° C.) | 31 | 36 | 48 | 47 |
| Poisson's ratio | 0.207 | 0.214 | 0.227 | 0.226 |
| Young's modulus ($\times 10^6$ N/m$^2$) | 914 | 901 | 861 | 858 |
| Flexural strength ($\times 10^6$ N/m$^2$) | 121 | 118 | 107 | 106 |
| Thermal shock resistance $\Delta t$ (° C.) | 339 | 286 | 200 | 203 |

TABLE II

|  | EXAMPLES | | | |
|---|---|---|---|---|
|  | 5 | 6 | 7 | 8 |
| $SiO_2$ | 57.7 | 56.5 | 61.9 | 61.6 |
| $P_2O_5$ | 8.4 | 8.2 | — | — |
| $Al_2O_3$ | 25.2 | 24.6 | 25.8 | 25.6 |
| $Li_2O$ | 4.2 | 4.1 | 4.6 | 4.6 |
| MgO | 1.0 | 1.0 | 2.1 | 2.1 |
| CaO | 1.0 | 1.0 | — | 1.0 |
| BaO | 1.0 | 3.1 | 4.1 | 4.1 |
| ZnO | 0.5 | 0.5 | 0.5 | — |
| $La_2O_3$ | — | — | — | — |
| $As_2O_3$ | — | — | 1.0 | 2.0 |
| $Sb_2O_3$ | 2.0 | — | — | — |
| Subtotal (wt. %) | 100.0 | 100.0 | 100.0 | 100.0 |
| Ratio of added amount of the rare earth oxide to total amount of the others | $Tb_2O_3$ 4.2 | $Tb_2O_3$ 4.1 | $Ce_2O_3$ 4.1 | $Sm_2O_3$ 4.1 |
| Total (wt. %) | 104.2 | 104.1 | 104.1 | 104.1 |
| Melting temperature (° C.) | 1530 | 1530 | 1550 | 1550 |
| Emission color | Green | Green | Blue | Orange |
| Wavelength of main emission (nm) | 485, 550 | 485, 550 | 420 | 560, 605, 650 |
| Coefficient of thermal expansion $\alpha \times 10^{-7}$/° C. (100° C. to 300° C.) | 47 | 49 | 49 | 48 |
| Poisson's ratio | 0.225 | 0.219 | 0.228 | 0.230 |
| Young's modulus ($\times 10^8$ N/m$^2$) | 848 | 831 | 837 | 838 |
| Flexural strength ($\times 10^6$ N/m$^2$) | 107 | 105 | 106 | 105 |
| Thermal shock resistance $\Delta t$ (° C.) | 208 | 201 | 200 | 201 |

TABLE III

|  | EXAMPLES | | Compared example |
|---|---|---|---|
|  | 9 | 10 |  |
| $SiO_2$ | 60.9 | 60.4 | 46.0 |
| $P_2O_5$ | — | — | 7.0 |
| $Al_2O_3$ | 26.4 | 26.1 | 18.0 |
| $Li_2O$ | 4.6 | 4.5 | 6.0 |
| MgO | 2.0 | 2.0 | 6.0 |
| CaO | 1.0 | 2.0 | 8.0 |
| BaO | 4.1 | 4.0 | 6.0 |
| ZnO | — | — | 2.0 |
| $La_2O_3$ | — | — | — |
| $As_2O_3$ | 1.0 | 1.0 | 1.0 |
| $Sb_2O_3$ | — | — | — |
| Subtotal (wt. %) | 100.0 | 100.0 | 100.0 |
| Ratio of added amount of the rare earth oxide to total amount of the others | $Eu_2O_3$ 4.1 | $Dy_2O_3$ 4.0 | $Tb_2O_3$ 4.0 |
| Total (wt. %) | 104.1 | 104.0 | 104.0 |
| Melting temperature (° C.) | 1550 | 1550 | — |
| Emission color | Pink | Yellow | — |
| Wavelength of main emission (nm) | 580, 615 | 485, 575 | — |
| Coefficient of thermal expansion $\alpha \times 10^{-7}$/° C. (100° C. to 300° C.) | 48 | 49 | 66 |
| Poisson's ratio | 0.229 | 0.231 | 0.233 |
| Young's modulus ($\times 10^8$ N/m$^2$) | 839 | 824 | 814 |
| Flexural strength ($\times 10^6$ N/m$^2$) | 105 | 106 | 94 |
| Thermal shock resistance $\Delta t$ (° C.) | 201 | 202 | 134 |

The glasses according to the examples 1 to 10 shown in Tables I, II and III are produced as follows.

The raw materials which are such as oxides, carbonates, nitrates, or the like are mixed to have the compositions in Tables I, II and III respectively. The resulting mixture is charged in a general melting apparatus, such as a platinum crucible, melted at the temperature of about 1530–1570° C., for about 8 hours, and homogenized by agitating. The homogenized mixture is cast in an iron board, annealed and cooled to room temperature, thus formed luminous glasses are obtained.

Each obtained glass has the transparency. Each glass emits light of the colors shown in Tables I, II and III when the glass is subjected to irradiation by the excitation light at wavelength of 365 nm. Accordingly, it is shown that these glasses according to the examples have optical activity. In the luminous glasses according to the examples 1 to 10, the colors of luminescence are differ according to the types of added oxides of rare earth elements. Therefore, it is exhibited that the colors of luminescence can be changed by changing the types or the like, of added rare earth elements.

Compared the examples 1 to 10 of the invention with the comparative example, even though these have similar range of compositions, the examples of the invention have lower coefficient of thermal expansion and larger flexural strength so that the examples of the invention have large thermal shock resistance Δt. That is, the glass is not always satisfied the desired properties above-described, just having the similar range of compositions. It is required for the luminous glass to have the desired properties above-described in the specific range of composition.

Table IV shows measured results of the mechanical properties of the luminous glasses according to the examples 1 and 2 and OHARA-made optical glass products.

TABLE IV

|  | Example 1 | Example 2 | OHARA-made glass FPL53 | OHARA-made glass BSL-7 | OHARA-made glass TIH-53 |
|---|---|---|---|---|---|
| Coefficient of thermal expansion $\alpha \times 10^{-7}/°C$ (100° C. to 300° C.) | 31 | 36 | 163 | 86 | 102 |
| Young's modulus ($\times 10^8$ N/m$^2$) | 914 | 901 | 694 | 802 | 970 |
| Poisson's ratio | 0.207 | 0.214 | 0.302 | 0.207 | 0.262 |
| Flexural strength ($\times 10^6$ N/m$^2$) | 121 | 118 | 49 | 94 | 76 |
| Δt (° C.) | 339 | 286 | 30 | 108 | 57 |

The coefficient of thermal expansion of the luminous glasses according to the examples of the invention is exceedingly low and the flexural strength thereof is large, so that the thermal shock resistance Δt thereof is exceedingly high, compared with the optical glass products as comparative examples, as shown in Table IV.

That is, the thermal shock resistance Δt of the comparative examples are at highest about 100, while the thermal shock resistance Δt of the luminous glasses according to the examples of the invention is not less than 150. Therefore, it is apparent that the luminous glasses according to the examples of the invention have superior thermal properties such as heat resistance and the like.

As described above, because the luminous glass of the invention has superior thermal shock resistance, it is hard to break even if the luminous glass is used under the environmental circumstances, temperature of which is largely or rapidly changed. As a result, it is possible to use the luminous glass of the invention under various conditions and circumstances.

Accordingly, because the luminous glass has superior homogeneity, low thermal expansivity, superior mechanical strength, and chemical durability and it is possible to drastically improve the melting property of the raw materials of the glass with having the good valance of these superior properties of the luminous glass, the luminous glass has superior formability and easiness of production.

Therefore, the luminous glass of the invention is preferable luminous materials to be applied to such a case that it is required to subjected to irradiation by the high-energy light, the temperature of the environmental circumstances is largely or rapidly changed, or it is required the chemical durability, or the like. In particular, the luminous glass is preferable when the transparency is required.

For example, the luminous glass of the invention can be applied to the oscillation medium for laser oscillation, the wavelength conversion filter for excitation light, the scintillator for radiation, standard sample for fluorescent substance, the fluorescent displaying board, decorative lighting, the cover glass for the solar battery, adjusting of optical axis for an extra-high pressure mercury lamp, excimer laser or the like, the fluorescent optical fiber, the ultraviolet ray-to-visible ray conversion image sensor.

Because it is possible to control the wavelength of emission, that is, luminescent color by selecting the types, amount and combination of types, of the rare earth elements, it is possible to apply the luminous glass to the fluorescent substance for illuminating or displaying and the electro luminescent materials.

According to the luminous glass of the invention, the glass is produced by the method for producing glass. Therefore, it is possible to form the glass in various forms such as plate shape, thin plate shape, fiber shape, thin layer tube shape, or the like.

The glass can be applied as powder by grinding the produced glass.

As described above, the luminous glass has superiority of such as physical properties to heat, ease of producing, transparentity, and the like compared with luminous glass in earlier technology.

From the foregoing description, one skilled in the art can easily ascertain the essential characteristics of this invention, and without departing from the spirit and scope thereof, can make various changes and modifications of the invention to adapt it to various usage and conditions.

The entire disclosure of Japanese Patent Application No. 10-254182 filed on Sep. 8, 1998 including specification, claims, drawings and summary are incorporated herein by reference in its entirety.

What is claimed is:

1. A luminous glass comprising:

$SiO_2$ in an amount of 53–62 weight percent calculated on an oxide basis;

a weight percent ratio of $Al_2O_3$ to $SiO_2$ is from 0.32 to 0.56;

BaO in an amount of 1–9 weight percent, calculated on an oxide basis; and wherein the luminous glass has a thermal shock resistance Δt° C. of not less than 150° C., wherein the thermal shock resistance Δt is obtained by the following equation, Δt=(flexural strength)×((1-Poisson's ratio))/((coefficient of thermal expansion)×(Young's modulus)).

2. A luminous glass as claimed in claim 1, wherein PbO, $B_2O_3$, BeO, $Na_2O$, and $K_2O$ are not essentially contained.

3. A luminous glass as claimed in claim 2, wherein the glass comprises the following components:

|  | wt. % |
|---|---|
| $SiO_2$ | 53–62 |
| $Al_2O_3$ | 18–30 |
| MgO | 0–12 |

-continued

| | wt. % |
|---|---|
| CaO | 0–16 |
| ZnO | 0–21 |
| $P_2O_5$ | 0–10 |
| $Li_2O$ | 0–8 |
| BaO | 1–9 |
| $Al_2O_3 + Sb_2O_3$ | 0–2 | wherein a ratio of $Al_2O_3$ to $SiO_2$ is 0.32–0.56, a total amount of MgO, CaO and ZnO is 2–34 wt. %, a total amount of $P_2O_5$, $Li_2O$, and BaO is 1–21 wt. %, and one or more rare earth elements are added to the glass on an oxide basis of 0.1–30 wt. % to a total amount of the components.

4. A luminous glass as claimed in claim 2, wherein the glass comprises the following components:

| | wt. % |
|---|---|
| $SiO_2$ | 53–62 |
| $Al_2O_3$ | 18–30 |
| MgO | 0–12 |
| CaO | 0–12 |
| ZnO | 0–18 |
| $P_2O_5$ | 0–10 |
| $Li_2O$ | 0–7 |
| BaO | 1–9 |
| $Al_2O_3 + Sb_2O_3$ | 0–2 | wherein a ratio of $Al_2O_3$ to $SiO_2$ is 0.32–0.56, a total amount of MgO, CaO, and ZnO is 2–28 wt. %, and one or more rare earth elements are added to the glass on an oxide basis of 0.1–30 wt. % to a total amount of the components.

5. A luminous glass as claimed in claim 2, wherein the glass comprises the following components:

| | wt. % |
|---|---|
| $SiO_2$ | 53–62 |
| $Al_2O_3$ | 18–30 |
| MgO | 1–10 |
| CaO | 0–8 |
| ZnO | 0–16 |
| $P_2O_5$ | 0–10 |
| $Li_2O$ | 2–6 |

-continued

| | wt. % |
|---|---|
| BaO | 1–6 |
| $Al_2O_3 + Sb_2O_3$ | 0–2 | wherein a ratio of $Al_2O_3$ to $SiO_2$ is 0.32–0.56, a total amount of MgO, CaO, and ZnO is 2–28 wt. %, and one or more rare earth elements are added to the glass on an oxide basis of 0.1–30 wt. % to a total amount of the components.

6. The luminous glass of claim 1, further comprising: MgO in an amount of 1–12 wt. %.

7. A method for producing a luminous glass having a thermal shock resistance $\Delta t°$ C. of not less than 150° C. according to claim 1, the method comprising:

mixing raw materials of components of the glass;

charging the resulting mixture into a melting apparatus;

melting the mixture at a temperature of about 1530–1570° C. for about 8 hours and homogenizing the mixture by agitating; and casting the homogenized mixture in an iron board, annealing and cooling to room temperature.

8. A method as claimed in claim 7, wherein PbO, $B_2O_3$, BeO, $Na_2O$, and $K_2O$ are not essentially contained.

9. A method as claimed in claim 8, wherein the luminous glass comprises the following components:

| | wt. % |
|---|---|
| $SiO_2$ | 53–62 |
| $Al_2O_3$ | 18–30 |
| MgO | 0–12 |
| CaO | 0–16 |
| ZnO | 0–21 |
| $P_2O_5$ | 0–10 |
| $Li_2O$ | 0–8 |
| BaO | 1–9 |
| $Al_2O_3 + Sb_2O_3$ | 0–2 | wherein a ratio of $Al_2O_3$ to $SiO_2$ is 0.32–0.56, a total amount of MgO, CaO and ZnO is 2–34 wt. %, a total amount of $P_2O_5$, $Li_2O$ and BaO is 1–21 wt. %, and one or more rare earth elements are added to the glass on an oxide basis of 0.1–30 wt. % to a total amount of the components.

* * * * *